April 17, 1951

R. T. SAVAGE 2,548,912

PROCESS OF AND APPARATUS FOR CONVERTING HYDROCARBON MATERIAL

Filed Aug. 6, 1947

INVENTOR.
Reuben T. Savage
BY
Gordon A. Kessler
ATTORNEY

April 17, 1951 R. T. SAVAGE 2,548,912
PROCESS OF AND APPARATUS FOR CONVERTING
HYDROCARBON MATERIAL
Filed Aug. 6, 1947 3 Sheets-Sheet 2

INVENTOR.
Reuben T. Savage
BY Gordon A. Kessler
ATTORNEY

INVENTOR.
Reuben T. Savage
BY
Gordon A. Kessler
ATTORNEY

Patented Apr. 17, 1951

2,548,912

UNITED STATES PATENT OFFICE 2,548,912

PROCESS OF AND APPARATUS FOR CONVERTING HYDROCARBON MATERIAL

Reuben T. Savage, Ridley Park, Pa., assignor to Houdry Process Corporation, Wilmington, Del., a corporation of Delaware Application August 6, 1947, Serial No. 766,714

10 Claims. (Cl. 196—52)

In the art of converting hydrocarbons, it is desirable for liquid phase hydrocarbon material to be applied directly to hot contact material as it gravitates downwardly through a reaction housing. This is true particularly when the charging stock contains heavy fractions because the latter, in the presence of the gravitating contact material, are either vaporized and converted, or converted directly to lower boiling products.

In prior practice involving utilization of a bed of gravitating contact material, the hydrocarbon charge material existed solely in the vapor phase upon entrance thereof to the reaction zone. In order to obtain vapors from a heavy liquid-containing charge, it was difficult, if not impossible, to effect complete or substantially complete vaporization of the charge in simple heating equipment without at the same time producing low anti-knock rating gasoline often in substantial quantity. This, as will be understood, is undesirable. Accordingly, in many catalytic cracking operations, it has been preferred in preparation of cracking stock to eliminate from crude petroleum or other source of hydrocarbons their content of heavy difficultly vaporizable components, if any, resulting in loss of charge stock in the cracking process.

On the other hand, application of a charge containing such heavy components directly to hot catalytic material gravitating through a conversion zone permits utilization of the entire charge, including its heaviest portions, for obtaining products having desired characteristics. If the contact mass is essentially inert catalytically, vaporization and other desired changes of heavy charge components are effected at conditions susceptible of easy control to limit or eliminate undesired reaction processes. In either event, particularly when the hot contact mass and liquid-containing charge are contacted adjacent the upper end of the reaction zone, the vaporization and other changes are initiated under practically ideal conditions of heat transfer between the charge and the contact mass thereby minimizing or even eliminating undesired conversions resulting inevitably from time-temperature treatments of such hydrocarbon charges.

In the process herein disclosed, contact material, in bed formation, gravitates through a housing and, in known manner, forms the conversion zone proper. Above the bed of contact material, in accordance with my invention, contact material having controlled conversion temperature gravitates downwardly and, by a control suitably effected, this gravitating contact material forms a freely falling curtain wherein the contact material has density and thickness sufficient at least to substantially prevent passage therethrough of atomized liquid hydrocarbon material while freely permitting a desired penetrating action to occur.

More particularly, the aforesaid control is effected in response to movement of the regenerated contact material through an annular metering passage having substantially uniform width throughout the circular length thereof, this operation producing, in its preferred aspects, a tubular curtain of contact material having the density and thickness characteristics noted above. The liquid phase hydrocarbon material is conducted interiorly of this tubular curtain and there atomized with resultant production of an atomized liquid medium which is engaged with said tubular curtain throughout an inner, circumferentially complete area thereof.

Further in accordance with the invention, the aforesaid curtain of contact material, whether tubular or not, is formed in a chamber of said housing above the bed of contact material, the atomizing operation also proceeding in this chamber. It is characteristic of the invention that the curtain of contact material, by reason of its thickness and density characteristics, prevents, substantially or entirely, passage or migration of atomized liquid material to the interior wall surface of the housing. In the absence of such a control, the migrating liquid material, as the conversion operation proceeds, engages said housing wall surface with resultant undesired deposition of carbonaceous material thereon.

In the above described chamber, sufficient vapor or gas pressure should be maintained above the bed or gravitating contact material to produce concurrent flow, as the operation proceeds, of the hydrocarbon material with respect to said gravitating contact material, this being desirable in order for the conversion operation to be effected in a satisfactory manner.

Various other objects and advantages of my invention will become apparent from the following detailed description.

My invention resides in the process of and apparatus for converting hydrocarbon material, the process steps and features hereinafter described and claimed.

For an understanding of my invention and for an illustration of one form of apparatus with which the invention may be practiced, reference is to be had to the accompanying drawings, in which.

Figure 1:
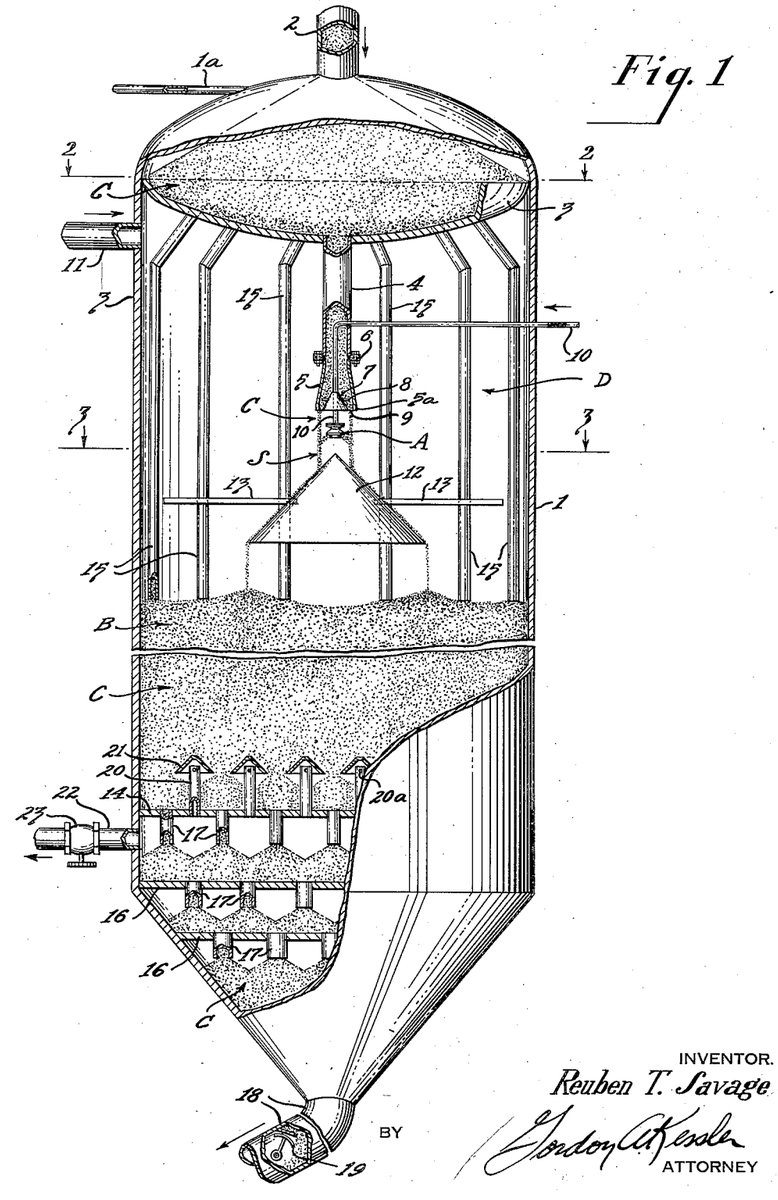
Fig. 1 is a vertical sectional view, partly in elevation, showing a conversion housing and associated mechanism as constructed in accordance with one form of the invention.
Figure 2:
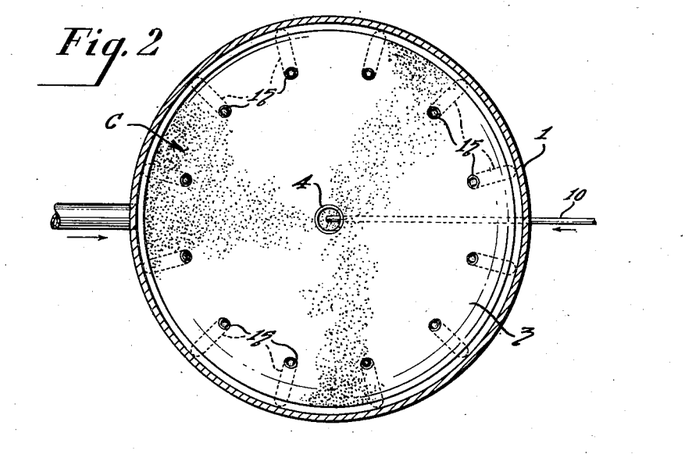
Figs. 2 and 3 are horizontal sectional views, partly in plan, taken on the respective lines 2—2 and 3—3 of Fig. 1.
Figure 3:
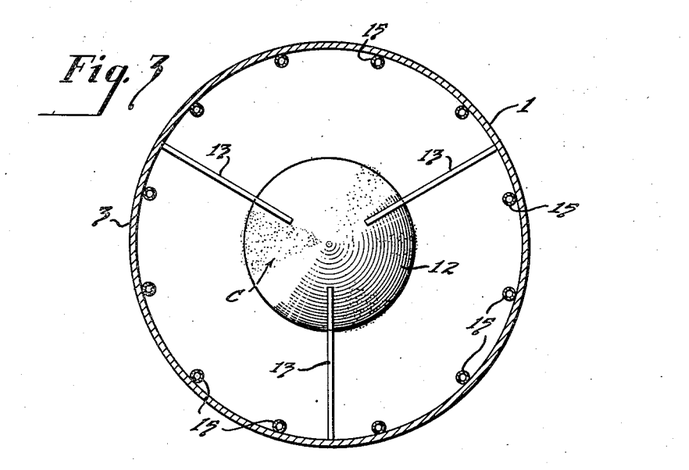

Referring particularly to Fig. 1, I have shown a vertical housing 1 which, in horizontal cross section, may be circular or of any other suitable configuration. The housing 1 defines a reaction zone wherein hydrocarbon material is cracked or otherwise converted in the presence of contact material C which moves downwardly therethrough under the influence of gravity, the contact material C being introduced into said housing 1 in suitable manner, as by an inlet pipe 2 extending through the top housing wall at the center thereof.

In the form of the invention herein shown, although not necessarily, a shallow receptacle-like member 3 is suitably supported in the upper portion of the housing 1, said member 3 having a central discharge pipe 4 opening therethrough and extending downwardly therefrom. If desired, although the invention is not to be so restricted, the lower end of the pipe 4 may have a frustro-conical pipe 5 suitably secured thereto, as by a flange-and-bolt connection 6, the lower end of the pipe 5, preferably, comprising a vertical lower end portion 5a, Fig. 4. With an arrangement of this character, said lower end portion 5a of the pipe 5 has diameter somewhat greater than that of the lower end of the pipe 4. Obviously, the pipes 4 and 5 may be replaced by a single pipe having desired uniform diameter throughout the length thereof.

Figures 4, 7:
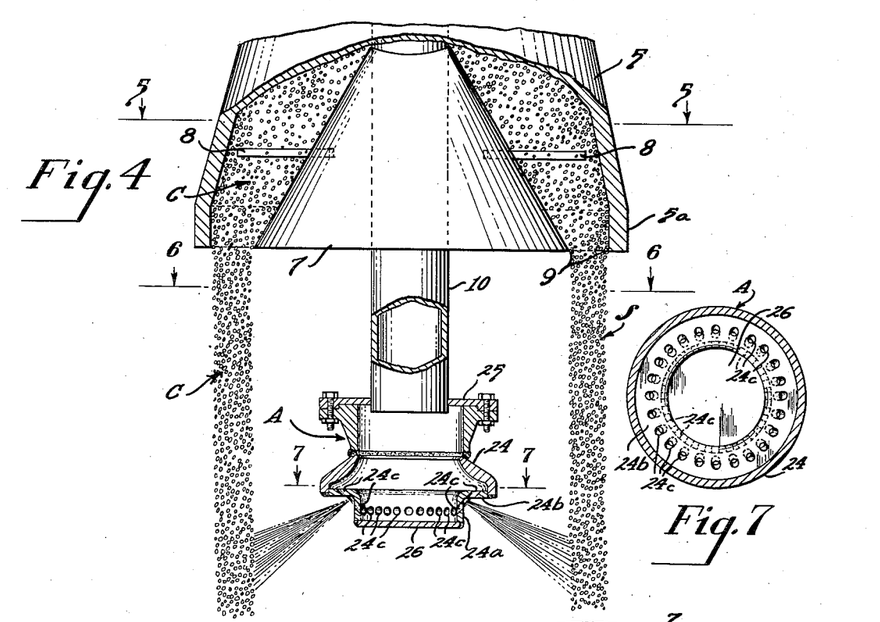
Fig. 4 is an enlarged vertical sectional view, partly in elevation, showing a metering passage for producing a stream or curtain of contact material and an associated atomizer.
Figs. 5, 6 and 7 are horizontal sectional views, partly in plan, taken on the respective lines 5—5, 6—6 and 7—7 of Fig. 4.
Figures 5, 6:
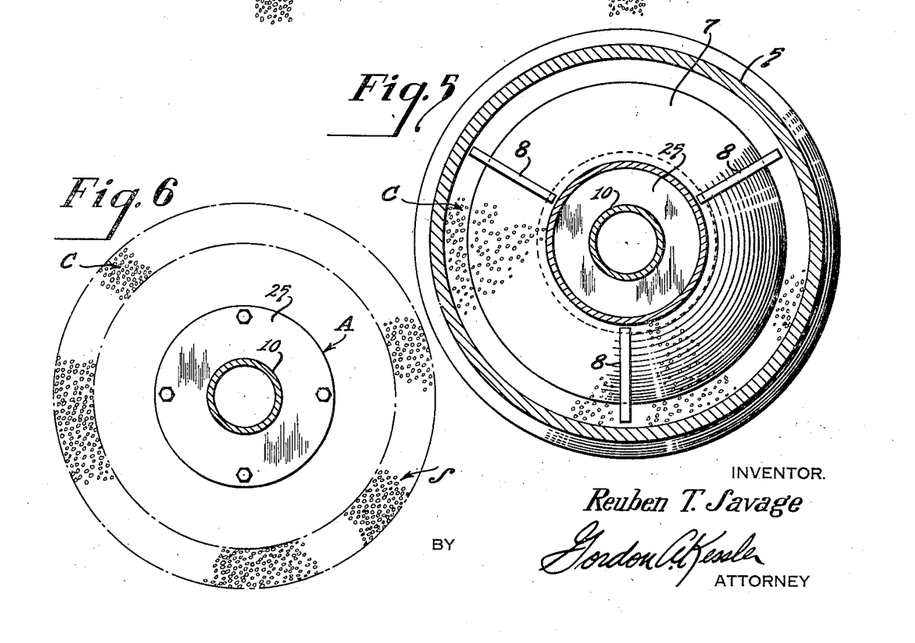

Disposed interiorly of said discharge pipe 5, immediately adjacent the lower end thereof, is a conical member 7, the lower surface of which, preferably but not necessarily, is positioned in the same horizontal plane as the lower surface of the pipe 5, said conical member 7 being suitably supported in the position shown, as by a plurality of bars 8 secured thereto and to said pipe 5. In accordance with the invention, the external diameter of the lower surface of the conical member 7 is suitably less than the internal diameter of the lower surface of the pipe end portion 5a and, accordingly, these two surfaces define an annular metering passage or orifice 9 utilizable as hereinafter described. The pipe end portion 5a and the conical member 7 should be symmetrically related to each other and, if so, the width of the annular passage 9 is uniform throughout the circular length thereof. Preferably, the arrangement is such that the exterior sloping surface of the conical member 7 forms with the interior sloping surface of the pipe 5 a path which diverges in a direction leading upwardly from the aforesaid annular passage 9.

A pipe 10 adapted, preferably but not necessarily, to be traversed by hydrocarbon material which is substantially or entirely in the liquid phase, extends from the exterior of the housing 1 to the interior thereof and, if desired, this pipe 10 may enter the aforesaid pipe 4 at any suitable level and pass downwardly through the pipes 4 and 5 in coincidence with the longitudinal axis thereof. If so, the pipe 10 passes through the aforesaid conical member 7, to which it is welded or otherwise suitable secured, and terminates a suitable distance below said conical member 7 where it communicates with and supports an atomizer A of any suitable character but which, preferably although not necessarily, is of the general character disclosed in pending application Ser. No. 756,032, filed June 20, 1947. A pipe 11 adapted to be traversed by hydrocarbon vapors extends from the exterior of the housing 1 to the interior thereof and, preferably, this pipe 11 is positioned at a higher level than the aforesaid pipe 10.

If desired, a conical member 12 or other deflecting arrangement may be positioned below the atomizer A, said conical member 12 being supported in any suitable manner, as by a plurality of bars 13 secured thereto and to the interior surface of the housing 1. The conical member 12, when utilized, should have diameter substantially exceeding that of the aforesaid conical member 7.

As shown, the pipe 4, the pipe 5, the conical member 7, the atomizer A and the conical member 12 should be so related to each other that their respective longitudinal axes are in coincidence with each other and also with the longitudinal axis of the housing 1.

In operation, regenerated contact material C having suitable conversion temperature passes continuously from the pipe 2 and, to suitable extent, fills the receptacle 3 which defines an upper zone of the housing 1. From the receptacle 3, the contact material gravitates downwardly through the pipe 4, the pipe 5 and then through the annular passage 9 which, in accordance with the invention and as hereinafter more fully described, has width such that it restricts or "chokes" the downward flow of contact material under the influence of gravity while moving along the described path above the plane of the annular passage 9. Below the plane of said annular passage 9, the contact material, in the form of the invention herein shown, falls freely under the influence of gravity as a tubular, relatively dense curtain or stream S until, after engaging and being deflected by the conical member 12, when utilized, it comes to rest upon and at least partly defines the upper surface of the bed B of gravitating contact material which defines the reaction zone proper, the bottom surface of the bed of contact material engaging a tube sheet 14 horizontally disposed in the housing 1 and suitably secured to the interior surface thereof. As the contact material falls freely as such a curtain below the plane of the annular passage 9, it is engaged, in accordance with the invention, by liquid hydrocarbon material after atomization thereof by the aforesaid atomizer A which, as shown in Fig. 4, is supported interiorly of the tubular curtain S by the aforesaid pipe 10.

In view of the foregoing, it clearly appears that the atomizer A is disposed in a chamber D of the housing 1, said chamber D being bounded, at its lower end, by the zone defined by the upper surface of the bed B and, at its upper end, by the aforesaid zone defined by the receptacle 3.

If desired, a plurality of pipes 15 may be spaced uniformly around the interior surface of the housing 1. The upper ends of these pipes 15 communicate with the chamber defined by the member 3, which may support said pipes, and the lower ends thereof terminate at the upper surface of the aforesaid bed of contact material, said pipes 15 being adapted to be traversed by a portion, preferably a minor portion, as 20% more or less of the total amount of contact material gravitating through the housing 1. The pipes 15, when utilized, contribute as regards maintenance of the surface of the bed B at a level approximately that of the lower ends of said pipes.

Any suitable arrangement may be utilized for discharging the contact material C from the housing 1. To this end and as diagrammatically indicated, a plurality of spaced horizontal tube sheets 16 may be secured to the interior surface of the lower end portion of the housing 1 below the aforesaid tube sheet 14, the extreme lower end portion of said housing 1, preferably, being conical as illustrated. A plurality of suitably spaced tubes or pipes 17 open through and depend from each of the tube sheets 14 and 16. As known in the art, the tubes 17 on successively lower tube sheets progressively decrease in number and the internal diameter thereof progressively increases whereby the contact material passes through the lower conical end portion of the housing 1 so as to reach and traverse a main discharge pipe or conduit 18 which should be inclined as illustrated. In known manner, a suitably controlled valve 19 is associated with the pipe 18 to restrict the flow of contact material therethrough and cause the bed B to be a "choked" bed by reason of the fact that downward movement, under the influence of gravity, of the contact material forming said bed B is restricted or impeded.

Adjacent the lower end of the housing 1, any suitable arrangement may be provided for disengaging cracked or converted vapors from the contact material C. To this end, as diagrammatically indicated, the aforesaid tube sheet 14 may support a plurality of tubes 20 which upstand therefrom and open therethrough, the tubes 20 supporting a plurality of suitably arranged channel members 21, or equivalent, which are disposed in inverted relation so that, in known manner, they may be utilized for disengagement of vapors from the contact material, the vapors thereafter entering the tubes 20 by way of passages 20a formed, respectively, therein. A pipe 22 opens through the wall of the housing 1 below the tube sheet 14 and communicates with the space above the adjacent conical piles of contact material. This pipe 22 may have associated therewith a control valve 23 and is adapted to receive and conduct the converted vapors to any suitable destination.

Referring particularly to Figs. 4 and 7, the atomizer A hereinbefore referred to should be one which produces fog, mist, spray or other liquid particles having suitable dimensions from the liquid hydrocarbon material admitted thereto. As shown, the atomizer A comprises a casing 24 having a top wall 25 through which the lower end of the aforesaid pipe 10 opens and to which said pipe is secured. The casing 24 has a lower wall 26 above which said casing 24 comprises circular portions 24a and 24b related to each other in right-angle relation. In the form of atomizer herein shown, although not necessarily, a row of ports or passages 24c open through the respective casing portions 24a and 24b, these ports 24c being alined in sets. Hydrocarbon material admitted by the pipe 10 to the casing 24 passes to and through each of said ports 24c. The atomizer A is located interiorly of the tubular curtain S a suitable distance below the annular passage 9 and, preferably, said atomizer A is so positioned that its rows of ports 24c, or equivalent, are concentrically related to the curtain S.

When hydrocarbon material is to be cracked in the housing 1, the contact material C hereinbefore referred to should be catalytic in character and the temperature thereof, upon admission to the housing 1, should range between 800° F. and 1000° F. or higher for example, about 900° F. Any suitable kind of catalytic contact material may thus be utilized such, for example, as activated clay pellets, or synthetic silica-alumina pellets or beads, etc. having suitable major dimensions such as between $\tfrac{1}{16}$ and ¾ of an inch. Other suitable catalysts for cracking include synthetic plural oxide composites, silicious or non-silicious in character, and containing, for example, zirconia, alumina or beryllia. In lieu of a cracking operation, other types of conversion operations such, for example, as one wherein hydrocarbon material of the character referred to below is desulphurized under known conditions with catalytic contact material of the general character referred to above, or equivalent. Or, reforming or dehydrogenation of naphthas or other normally liquid hydrocarbons may be effected in the presence of the above or other desired types of catalyst, certain of which are well known in the art.

During operation, vapors such, for example, as vaporized gas oil, naphtha or lighter hydrocarbons having suitable elevated temperature, as in a range from 850° F. to 950° F. are admitted continuously to the housing 1 by way of the conduit 11. Simultaneously, liquid hydrocarbon material such, for example, as a suitable residual stock, topped or reduced crude having temperature elevated into a suitable range as, for example, from 400° F. to 850° F. is charged continuously through the pipe 10 under superatmospheric pressure ranging, for example, from 10 lbs. to 200 lbs. per square inch gauge or as otherwise may be required for causing the atomized liquid material from the atomizer A to engage and properly penetrate the contact material forming the hereinbefore described falling curtain S of contact material. The liquid hydrocarbon material thus traversing the pipe 10 passes through the atomizer casing 24 and then through the sets of alined ports 24c.

As regards each set of alined atomizer ports, streams of hydrocarbon material pass, respectively, in opposite directions along substantially a straight-line path which is suitably related to a horizontal plane. These streams engage each other in head-on relation between the two alined ports and, due to such engagement and also due to the presence of the barrier defined by the aforesaid casing portions 24a and 24b, there is a resultant stream of atomized material which passes downwardly in an inclined direction, Fig. 4. Preferably, this atomized material exists as a mist or fog and, as it moves from the atomizer A, there is substantial divergence thereof.

It will be understood that a corresponding stream of atomized material passes from each of the other sets of alined ports 24c. Accordingly, it follows that the respective streams of atomized liquid material pass along paths radiating from a common center which coincides with the longitudinal axis of the atomizer A. These streams of atomized liquid material merge with each other soon after leaving the atomizer A and, in merged condition, engage and penetrate said curtain S of contact material while moving downwardly in inclined directions as indicated in Fig. 4.

As hereinbefore stated, the annular passage 9 has width such that it restricts or chokes the downward flow of contact material under the influence of gravity while moving along its path above the plane of said annular passage 9. It is a distinct feature of the invention that this control of the annular passage 9 causes the falling curtain S of contact material to have and maintain substantially uniform thickness at least until after it has passed through the zone where the atomized liquid material is engaged with the interior surface thereof. Further, in this zone and in response to the aforesaid control, the thickness of the curtain S and the density of the pieces of contact material forming said curtain S are sufficient to entirely or at least substantially prevent passage therethrough of any of the atomized liquid material which is produced and directed into engagement therewith by the atomizer A. In addition, the operation should be conducted under conditions, which are determined principally by the curtain density and thickness, and the velocity of the atomized liquid material, such that the atomized liquid material substantially penetrates the falling curtain S so that each piece of contact material, with the exception perhaps of those at the extreme outer curtain surface, receives a charge of the atomized liquid material. However, as will be understood, the pieces of contact material defining the inner portion of the falling curtain S receive a somewhat greater share of the atomized liquid material than those defining the outer portion thereof.

As the operation proceeds, hydrocarbon vapors, preferably having temperature as referred to above are admitted to the housing 1 by way of the pipe 11. These vapors pass through the housing 1, concurrently, for a reason hereinafter stated, as regards the contact material C and, in the presence thereof, are converted to cracked products. In so doing, the heat content of these vapors assists as regards vaporization of the liquid hydrocarbon material entering said housing 1 through the atomizer A and provide a desired control on the space velocity of the entire charge traversing the housing 1. Simultaneously, in the manner described above, atomized liquid hydrocarbon material is engaged with the interior surface of the falling curtain S of contact material throughout a circumferentially complete area thereof with resultant vaporization of such atomized liquid material and formation of cracked products while passing through the housing 1 concurrently, for a reason hereinafter stated, as regards the contact material C. As regards the total charge entering the housing 1, the ratio of vapors to liquid material may be such as is suitable and desirable. Thus, for example, between 10% and 30% of the charge may be in the liquid phase for passage to the atomizer A and the remainder in the vapor phase for passage through the pipe 11.

The falling curtain S of contact material functions in the manner described to substantially or entirely prevent passage of atomized liquid material therethrough. This curtain, then, positively prevents or minimizes to insignificant extent migration of atomized liquid material to interior surfaces of the housing 1 and the pipes 15 in the event that the latter are utilized. Consequently, formation of carbonaceous material on the metallic housing and pipe surfaces is entirely or substantially prevented. This is highly desirable by reason of the fact that, if there is any substantial formation of carbonaceous material in the locations stated, chunks thereof separate from the main mass and move into and through the bed B of contact material with resultant partial or complete plugging of the outlets at the bottom of the housing. Should this happen to any substantial extent, it is necessary for operation of the system to be discontinued for cleaning purposes and this, of course, is undesirable.

It was stated above that the contact material at the inner portion of the curtain S receives a somewhat greater share of atomized liquid material than the contact material at the outer portion of said curtain S. Hence, in accordance with a detailed feature of the invention, the contact material forming the falling curtain S may engage the conical member 12 prior to the time that it passes into engagement with the top surface of the bed B. As a result, a mixing action occurs to improve uniformity of distribution as regards individual pieces of contact material bearing different respective quantities of the atomized liquid material. In lieu of the conical member 12, any equivalent mixing device may be utilized for the purpose described. Further, as stated above, the conical member 12, or equivalent may be omitted and, if so, the contact material C falls freely along a vertical path from the annular passage 9 directly to the top of the bed B.

By reason of the fact that the contact material is choked above the plane of the annular passage 9, it will be understood that, in this annular passage, the pieces of contact material engage each other and, hence, have maximum density in this location. As the pieces of contact material fall freely under the influence of gravity, they move further from each other in a progressively increasing manner and this, of course, decreases the density of the curtain. As at present preferred and in order to assure favorable penetration of the atomized liquid material through the falling curtain S, the vertical distance of the atomizer A below the annular passage 9 is selected so that said atomized liquid material engages the falling curtain S after the density or compactness thereof has decreased to some slight extent. However, the invention is not to be thus limited because it may be desirable to position the atomizer A closely adjacent the annular passage 9 so that the atomized liquid material is engaged with the falling contact material while the density thereof is substantially at a maximum.

As hereinbefore explained in a detailed manner, the annular passage 9 restricts or chokes downward movement of contact material through the pipes 4 and 5, the contact material, below the plane of said annular passage 9, falling freely in a vertical direction under the influence of gravity and forming the aforesaid curtain or stream S until after it is engaged by the atomized liquid material from the atomizer A. Thus, the contact material, until it has passed below the zone wherein atomized liquid material is engaged therewith, moves downwardly only in a vertical direction after leaving the metering orifice defined by the annular passage 9. This is highly desirable in accordance with the invention because insuring the production of a curtain of contact material having substantially uniform thickness throughout the desired effective length thereof and, further, because rendering it practical to engage the atomized liquid material with the curtain of contact material before the density or compactness thereof has decreased to an undesired extent.

For purposes of explanation and without limitation of the invention, the following detailed description relating to a period of actual operation is included as a part of this specification.

The housing 1 had internal diameter of 16 feet. The lower pipe portion 5a had external diameter of 18 inches and internal diameter at the lower end thereof of 16 5/16 inches. The external diameter of the conical member 7 was 13½ inches. Therefore, the uniform width of the annular passage 9, throughout the circular length thereof, was approximately 1½ inches and the thickness of the falling curtain S was approximately the same. The contact material C was formed from spheres, each having diameter of approximately 0.154 inch ranging down to fines. When contact material of this character was fed through the pipes 4, 5 at a rate of 85 tons per hour, the aforesaid curtain S was approximately seven to nine pieces of contact material thick in any horizontal direction.

Excellent results were obtained when the conditions of operation were as noted immediately above. However, the invention is not to be thus limited because, obviously, the thickness of the falling curtain S may depart widely from the dimension referred to above. Thus, for example, said curtain may have thickness ranging from one inch upwardly to approximately six inches, if desired, but in any event the contact material should be sufficiently dense for the intended purpose.

Accordingly, in view of the foregoing, it will be understood that hydrocarbon material admitted to the housing 1 by way of the pipes 10 and 11 is converted in the presence of the contact material C to produce cracked products. As the operation proceeds, hydrocarbon vapors, principally, fill the aforesaid chamber D under pressure determined by the pressure existing in the hereinbefore described pipe 22. In known manner, a suitable sealing medium, such as a stream of flue gases, is admitted to the top of the housing by way of a pipe 1a, Fig. 1, this sealing medium being maintained under pressure slightly greater than that of said hydrocarbon vapors last named in order to prevent passage of these hydrocarbon vapors upwardly through the pipe 2. Due to this pressure relation which exists in the chamber D, the hydrocarbon material admitted thereto as described above, is caused to pass downwardly concurrently as regards the gravitating contact material, this hydrocarbon material being cracked in the presence of said contact material and the resulting cracked vapors being disengaged therefrom at the channel members 21. Thereafter, in the form of the invention herein shown, these cracked vapors enter the tubes 20 by way of the respective passages 20a, pass downwardly through said tubes and enter the space below the tube sheet 14, said cracked vapors passing to any suitable destination by way of the hereinbefore described pipe 22. In known manner and by suitable means, not shown, a suitable gaseous medium, such as steam is admitted to the lower portion of the housing 1, below the pipe 22 and under pressure above that existing at the level thereof, to prevent passage of hydrocarbon vapors through the pipe 18.

As the operation proceeds, the spent contact material C passes through the groups of tubes 17 in succession and then leaves the housing 1 by way of the pipe 18. Thereafter, in suitable manner, said spent contact material is regenerated and then returned to the inlet pipe 2 for readmission to said housing 1.

My invention has hereinbefore been described with respect to a present preferred form thereof involving the formation of a tubular curtain or stream S of gravitating contact material to the interior surface of which the atomized liquid material is applied, said tubular curtain S being circular in horizontal section. Obviously, however, the invention is not to be thus limited. Thus, the tubular stream or curtain of contact material may be non-circular in horizontal section. Further, in a broader aspect of the invention, the annular passage 9 may be omitted in favor of a metering orifice formed, for example, to produce a stream of contact material having desired non-tubular configuration which, as regards the contact material, is characterized by uniformity of thickness, sufficient thickness, proper density, etc. all as hereinbefore described with respect to the tubular curtain or stream S of contact material.

As described above, the hydrocarbon material supplied to the atomizer A may be entirely or substantially in the liquid phase. However, if desired, mixed phase hydrocarbon material having hydrocarbon vapors or other vapors and hydrocarbon liquid material in desired proportion may be supplied to said atomizer A for application to the curtain S. With an operation of this character, the quantity of hydrocarbon vapors admitted to the housing 1 by the pipe 11 may be decreased as desired and, under some circumstances, the total vapor and liquid phase charge may be passed to the atomizer A or equivalent for application to tubular stream or curtain S of contact material. Or, if desired, the total charge may consist solely of liquid phase hydrocarbon material which is supplied to the atomizer A.

The preceding description relates to catalytic conversion processes but the invention is not to be so limited. Thus, the contact material C may be substantially inert catalytically such, for example, as fused alumina (alundum), fused silica and alumina, heat-resistant quartz or quartz pebbles, fused silica, etc., this material having approximately spherical or chunk-like configuration and the major dimensions ranging between ¼ to ¾ of an inch, for example. With contact material of this character, hydrocarbon vapors may be admitted to the housing 1 by way of the pipe 11 under the conditions hereinbefore described and the atomizer A may be supplied with at least partially liquid phase heavy hydrocarbon material such, for example, as entire crudes, reduced or topped crudes, crude bottoms, residual or heavy bottoms, distillation residuums, etc., all of which contain heavy, difficultly vaporizable fractions or components such as tar, asphalt or the like in various proportions. Inert contact material of the character described should gravitate through the housing while having temperature within a range between 800° F. and 1250° F. and heavy hydrocarbon material should be supplied to the atomizer A while having temperature ranging up to 750° F. or higher. When the operation is of this character, the liquid portion of the heavy hydrocarbon material is vaporized and viscosity-broken in response to engagement thereof with the freely falling inert contact material and that forming the top surface of the bed B, the resulting vaporized products being withdrawn from the housing 1 by way of the conduit 22.

Obviously many modifications and variations of the invention as hereinbefore set forth may be made without departing from the spirit and scope thereof and, therefore, only such limitations should be imposed as are indicated in the appended claims.

I claim as my invention:

1. In a process for the conversion of heavy, relatively non-volatile hydrocarbons using particles of fluent contact material wherein said particles flow downwardly from a location above a confined zone into said confined zone and onto the top surface of a wide compact bed of said particles within said zone, which top surface is spaced below the top of said confined zone, then gravitate downwardly as a compact non-turbulent bed and discharge through a constricted zone below said bed, the total horizontal area of said constricted zone being a small fraction of the horizontal area of said bed; the method which comprises flowing contact material downwardly in compact non-turbulent flow to and through an annular metering zone located above the top surface of said bed and spaced away from the sides of said confined zone, said metering zone having a uniform annular width and having a horizontal periphery which is a small fraction of that of said bed; discharging particles of contact material from said metering zone as a thick, dense, sheet-like curtain of particles of contact material falling freely and unobstructedly downwardly, said curtain having such a thickness and density as to intercept atomized liquid hydrocarbons directed thereto; directing atomized liquid hydrocarbons toward said curtain so that said curtain is interposed between said atomized liquid hydrocarbons and the sides of said confined zone; and removing hydrocarbon vapors including those formed by contact of said contact material and said liquid hydrocarbon material from said confined zone.

2. In a process for the conversion of heavy, relatively non-volatile hydrocarbons using particles of fluent contact material wherein said particles flow downwardly from a location above a confined zone into said confined zone and onto the top surface of a wide compact bed of said particles within said zone, which top surface is spaced below the top of said confined zone, then gravitate downwardly as a compact non-turbulent bed and discharge through a constricted zone below said bed, the total horizontal area of said constricted zone being a small fraction of the horizontal area of said bed; the method which comprises flowing hot contact material downwardly in compact non-turbulent flow to and through an annular metering zone located above the top surface of said bed and spaced away from the sides of said confined zone, said metering zone having a uniform annular width and having a horizontal periphery which is a small fraction of that of said bed; discharging particles of contact material from said metering zone as a thick, dense, sheet-like tubular curtain of particles of contact material falling freely and unobstructedly downwardly in substantially straight vertical paths within said confined zone, said curtain having such a thickness and density as to intercept atomized liquid hydrocarbons directed thereto; directing atomized liquid hydrocarbons at a temperature substantially below the temperature of said contact material from within said tubular curtain toward said curtain so that said curtain is interposed between said atomized liquid hydrocarbons and the sides of said confined zone, the amount of said atomized hydrocarbon material being such that at least the majority of said atomized hydrocarbons penetrates said curtain without emerging from the far side thereof; and removing hydrocarbon vapors including those formed by contact of said contact material and said liquid hydrocarbon material from said confined zone.

3. The method of claim 2 in which the hydrocarbon conversion effected is cracking and the contact material comprises an active hydrocarbon cracking catalyst.

4. The method of claim 2 in which the hydrocarbon conversion effected is viscosity-breaking and the contact material is a solid heat carrier.

5. In a process for the conversion of heavy, relatively non-volatile hydrocarbons using particles of fluent contact material wherein said particles flow downwardly from a location above a confined zone into said confined zone and onto the top surface of a wide compact bed of said particles within said zone, which top surface is spaced below the top of said confined zone, then gravitate downwardly as a compact non-turbulent bed and discharge through a constricted zone below said bed, the total horizontal area of said constricted zone being a small fraction of the horizontal area of said bed; the method which comprises flowing hot contact material downwardly in compact non-turbulent flow to and through an annular metering zone located above the top surface of said bed and spaced away from the sides of said confined zone, said metering zone having a uniform annular width and having a horizontal periphery which is a small fraction of that of said bed; discharging particles of contact material from said metering zone as a thick, dense, sheet-like tubular curtain of particles of contact material falling freely and unobstructedly downwardly in substantially straight vertical paths within said confined zone, said curtain having such a thickness and density as to intercept atomized liquid hydrocarbons directed thereto; directing atomized liquid hydrocarbons at a temperature substantially below the temperature of said contact material from within said tubular curtain toward said curtain so that said curtain is interposed between said atomized liquid hydrocarbons and the sides of said confined zone, the amount of said atomized hydrocarbon material being such that at least the majority of said atomized hydrocarbons penetrates said curtain without emerging from the far side thereof; introducing hydrocarbon vapors at a substantial pressure from outside said confined zone to essentially the top of said confined zone and passing the hydrocarbon vapors introduced to the top of the confined zone and the hydrocarbon vapors formed by contact with said contact material downwardly through said bed concurrently under conversion conditions.

6. In a process for the conversion of heavy, relatively non-volatile hydrocarbons using particles of hot fluent contact material wherein said particles flow downwardly from a location above a confined zone into said confined zone and onto the top surface of a wide compact bed of said particles within said zone, which top surface is circular and is spaced below the top of said confined zone, then gravitate downwardly as a compact non-turbulent bed and discharge through a constricted zone below said bed, the total horizontal area of said constricted zone being a small fraction of the horizontal area of said bed; the method which comprises flowing a portion of said hot contact material downwardly in compact non-turbulent flow to a circular annular metering zone located above the top surface of said bed and spaced away from the sides of said confined zone, said metering zone having a uniform annular width and having a circumference which is a small fraction of that of said bed; passing said particles through said metering zone in choked flow; discharging particles of contact material from said metering zone as a thick, dense, sheet-like horizontally circular curtain of particles of contact material falling freely and unobstructedly downwardly in substantially straight vertical paths within said confined zone, said curtain having such a thickness and density as to intercept atomized liquid hydrocarbons directed thereto; directing atomized liquid hydrocarbons at a temperature substantially below the temperature of said contact material from within said tubular curtain toward a portion of said curtain so that said curtain is interposed between said atomized liquid hydrocarbons and the sides of said confined zone, the amount of said atomized hydrocarbon material being such that at least the majority of said atomized hydrocarbons penetrates said curtain without emerging from the far side thereof; non-turbulently flowing the remainder of said hot contact material downwardly from said location above the confined zone to the surface of said bed as a plurality of solid compact columns located outside of said curtain of particles; and removing hydrocarbon vapors including those formed by contact of said contact material and said liquid hydrocarbon material from said confined zone.

7. In a process for the conversion of heavy, relatively non-volatile hydrocarbons using particles of hot fluent contact material wherein said particles flow downwardly from a location above a confined zone into said confined zone and onto the top surface of a wide compact bed of said particles within said zone, which top surface is circular and is spaced below the top of said confined zone, then gravitate downwardly as a compact non-turbulent bed and discharge through a constricted zone below said bed, the total horizontal area of said constricted zone being a small fraction of the horizontal area of said bed; the method which comprises flowing a portion of said hot contact material downwardly in compact non-turbulent flow to a circular annular metering zone located above the top surface of said bed and spaced away from the sides of said confined zone, said metering zone having a uniform annular width and having a circumference which is a small fraction of that of said bed; passing said particles through said metering zone in choked flow; discharging particles of contact material from said metering zone as a thick, dense, sheet-like horizontally circular curtain of particles of contact material falling freely and unobstructedly downwardly in substantially straight vertical paths within said confined zone, said curtain having such a thickness and density as to intercept atomized liquid hydrocarbons directed thereto; directing atomized liquid hydrocarbons at a temperature substantially below the temperature of said contact material from within said tubular curtain toward a portion of said curtain so that said curtain is interposed between said atomized liquid hydrocarbons and the sides of said confined zone, the amount of said atomized hydrocarbon material being such that at least the majority of said atomized hydrocarbons penetrates said curtain without emerging from the far side thereof; non-turbulently flowing the remainder of said hot contact material downwardly from said location above the confined zone to the surface of said bed as a plurality of solid compact columns located outside of said curtain of particles; deflecting the particles in said curtain, after contact with the atomized liquid hydrocarbons, in a direction away from the center of said tubular curtain and toward the sides of the confined zone, whereby the particles in said curtain are distributed over a portion of the top surface of said bed greater than the horizontal area defined by the outer periphery of said curtain; and passing hydrocarbon vapors including vapors formed by contact with said contact material through said bed under conversion conditions.

8. An apparatus comprising a vertical housing, a contacting chamber, means for introducing fluent solid particles to the upper end of said contacting chamber comprising a vertical conduit having a circular lower end, a circular member within the lower end of said conduit and forming an annular metering passageway for fluent solid particles with said lower end, an atomizer disposed immediately below said circular member and concentrically therewith, means for introducing liquids to said atomizer from the exterior of said housing, a cone having a base substantially greater than the outer periphery of said circular member, said cone being disposed with its apex upward a short distance below said atomizer and being positioned concentrically with respect to said circular member, means for removing fluids from said contacting chamber and said housing and means for removing fluent solid particles from said contacting chamber and said housing.

9. The method for converting high boiling hydrocarbons at least partially in the liquid phase to lower boiling hydrocarbons which comprises flowing particles of fluent granular contact material from a confined accumulation of said particles located above a conversion zone onto the surface of a bed of said particles in the lower part of said conversion zone as a plurality of confined streams of said particles passing through a gas space in the upper part of said conversion zone, said confined streams passing downwardly from said accumulation to said bed near the periphery of said gas space, simultaneously flowing particles of said contact material downwardly in compact non-turbulent flow from said accumulation to a metering zone located above the top surface of said bed and in the central portion of said gas space, passing said particles through said metering zone in choked flow, discharging particles of contact material from said metering zone as a thick, dense, sheet-like curtain of particles of contact material falling freely and unobstructedly downwardly in said gas space, said curtain having such a thickness and density as to intercept liquid hydrocarbons directed thereto, directing atomized liquid hydrocarbons toward said curtain so that said curtain is interposed between said atomized liquid hydrocarbons and the sides of said gas space, withdrawing particles of contact material from the bottom of said conversion zone, removing hydrocarbon vapors including those formed by contact of said particles of contact material and liquid hydrocarbons from said conversion zone, flowing a substantially inert sealing gas into said accumulation at a pressure such that it prevents escape of gaseous hydrocarbons from said conversion zone into said accumulation.

10. In a process for the conversion of heavy, relatively non-volatile hydrocarbons using particles of fluent contact material wherein said particles flow downwardly from a location above a confined zone into said confined zone and onto the top surface of a wide compact bed of said particles within said zone, which top surface is spaced below the top of said confined zone, then gravitate downwardly as a compact non-turbulent bed: the method which comprises flowing contact material downwardly in compact non-turbulent flow to and through an annular metering zone located above the top surface of said bed and spaced away from the sides of said confined zone, said metering zone having a horizontal periphery which is a small fraction of that of said bed; discharging particles of contact material from said metering zone as a thick, dense, sheet-like curtain of particles of contact material falling freely and unobstructedly downwardly, said curtain having such a thickness and density as to intercept atomized liquid hydrocarbons directed thereto; directing atomized liquid hydrocarbons toward said curtain so that said curtain is interposed between said atomized liquid hydrocarbons and the sides of said confined zone; deflecting the particles in said curtain, after contact with the atomized liquid hydrocarbons, divergently outward toward the sides of said confined zone, whereby the particles in said curtain are distributed over a portion of the top surface of said bed greater than the horizontal area defined by the outer periphery of said curtain, and removing hydrocarbon vapors including those formed by contact of said contact material and said liquid hydrocarbon material from said confined zone.

REUBEN T. SAVAGE.

REFERENCES CITED

The following references are of record in the file of this patent:

UNITED STATES PATENTS

| Number | Name | Date |
|---|---|---|
| 1,836,325 | James | Dec. 15, 1931 |
| 2,227,634 | Dalin | Jan. 7, 1941 |